[19] United States Patent
Olsson

[11] Patent Number: 4,603,776
[45] Date of Patent: Aug. 5, 1986

[54] CONVEYOR BELT
[75] Inventor: Lennart Olsson, Nyhamnsläge, Sweden
[73] Assignee: Frigoscandia Contracting AB, Sweden
[21] Appl. No.: 554,346
[22] Filed: Nov. 22, 1983
[30] Foreign Application Priority Data
Nov. 26, 1982 [SE] Sweden ................................ 8206760
[51] Int. Cl.⁴ ............................................ B65G 21/18
[52] U.S. Cl. ...................................... 198/778; 198/822
[58] Field of Search ............... 198/778, 822, 831, 328, 198/852

[56] References Cited
U.S. PATENT DOCUMENTS 3,233,722  2/1966  Jorgenson ............................ 198/822
3,938,651  2/1976  Alfred et al. ......................... 198/778
4,078,655  2/1978  Roinestad ........................ 198/778 X Primary Examiner—Joseph E. Valenza
Assistant Examiner—Michael Stone
Attorney, Agent, or Firm—Shapiro and Shapiro

[57] ABSTRACT

A conveyor belt, which is adapted in endless condition to follow through part of its length a path comprising a number of superposed, helically extending turns, comprises link means which are articulated with one another and are relatively adjustable and comprise a bottom part and spacing members arranged at the longitudinal edges of said bottom part and constituting the two sides of the belt, said spacing members being adapted with their upper edge portions to bear against the lower edge portions of the overlying turn of the conveyor belt in order to permit this to carry the underlying belt turn, at least part of the spacing members being adapted with their upper edge portions to engage shoulders at the lower edge portions of the spacing members of the overlying turn of the conveyor belt so as to prevent lateral displacement of the belt turns. The spacing members are through part of their length fixedly connected to the longitudinal edges of the bottom part while the remaining part is movable relative to the bottom part and provided with a flange which is inclined downwards in inward direction, said flanges constituting the shoulders with which the upper edge portions of the spacing members are adapted to engage in order to prevent lateral displacement of the belt turns.

6 Claims, 5 Drawing Figures

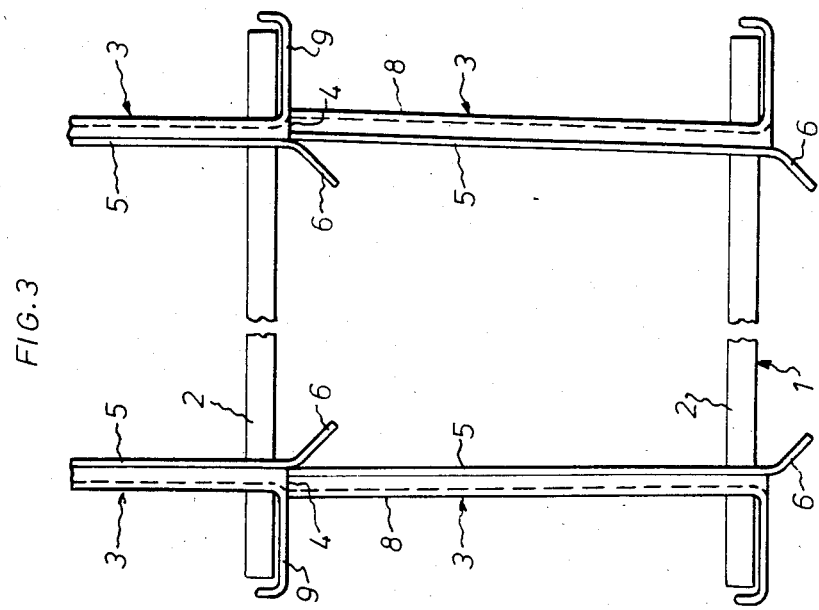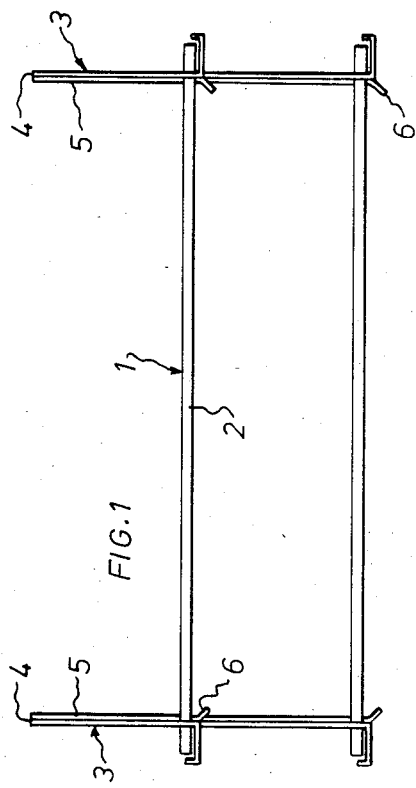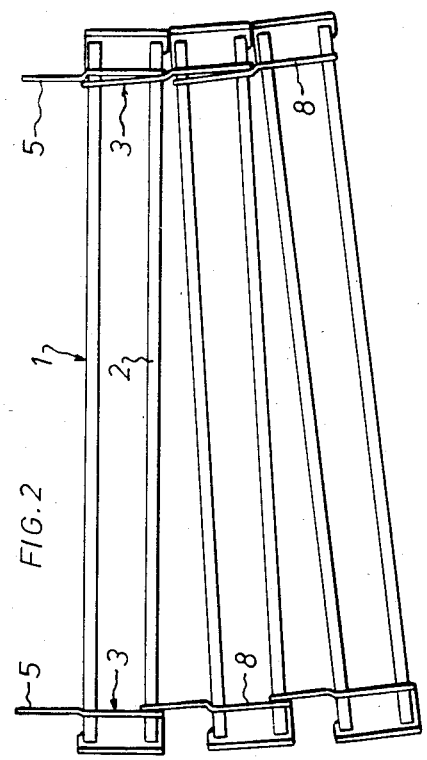

CONVEYOR BELT

From Swedish Pat. No. 381 241 there is previously known a conveyor belt which is adapted in endless condition to follow through part of its length a path comprising a number of superposed, helically extending turns, said conveyor belt comprising link means which are articulated with one another and are relatively adjustable and comprise a bottom part and spacing members arranged at the longitudinal edges of said bottom part and constituting the two sides of the belt, said spacing members being adapted with their upper edge portions to bear against the lower edge portions of the overlying turn of the conveyor belt in order to permit this to carry the underlying belt turn, at least part of the spacing members being adapted with their upper edge portions to engage shoulders at the lower edge portions of the spacing members on at least one side of the overlying turn of the conveyor belt so as to prevent lateral displacement of the belt turns. The present invention is a development of said conveyor belt, which is characterized in that the spacing members through part of their length are fixedly connected to the longitudinal edges of the bottom part while the remaining part is movable relative to the bottom part and provided with a flange which is inclined downwards in inward direction, said flanges constituting the shoulders with which the upper edge portions of the spacing members are adapted to engage in order to prevent lateral displacement of the belt turns. With this invention an efficient means has thus been provided to prevent lateral displacement of the belt turns since the flange cannot reasonably leave its position during piling of the belt turns. Add to this that the flanges on opposite sides of the conveyor belt press out the spacing members at the underlying turn, which prevents the bottom part from bending due to the load thereon.

The invention will be described in more detail below with reference to the accompanying drawings which illustrate by way of example an embodiment of the conveyor belt and in which:

FIG. 1 shows a cross-section of two conveyor belt parts piled upon one another;

FIG. 2 is a top plan view of part of the conveyor belt;

FIG. 3 shows on a larger scale the edge portions of the conveyor belt parts according to FIG. 1;

Figure 4:
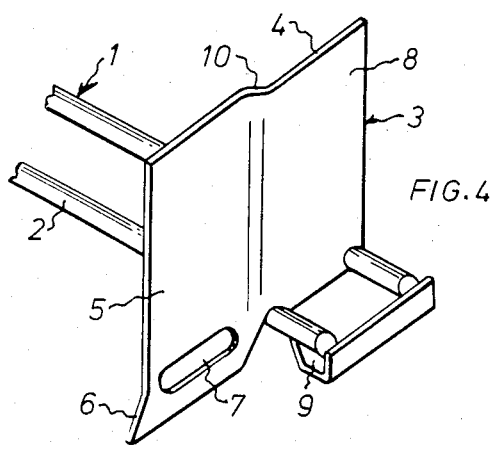
FIG. 4 is a perspective view of the spacing members arranged on the longitudinal edges of the conveyor belt.

The conveyor belt 1 is adapted in endless condition to follow through part of its length a path comprising a number of superposed, helically extending turns. For this purpose it is constructed so that it can travel straight as well as in curves. In the embodiment shown the conveyor belt 1 comprises a bottom part 2 and links 3 arranged on the longitudinal edges of said part and constituting the two sides of the belt, said links being adjustable relative to transversely extending staff-shaped members included in the bottom part 2. The links 3 are designed as spacing members which are adapted with their upper edge portions to bear against the lower edge portions of the overlying turn of the conveyor belt 1 in order to permit this to carry the underlying belt turn. In another embodiment the bottom part 2 of the conveyor belt 1 may be provided with a centrally located chain means transmitting the force between the transversely extending staff-shaped members of the bottom part 2. In this embodiment the members 3 arranged on the longitudinal edges of the bottom part 2 have only the function of spacing members since they are in no way designed as links.

At least some of the spacing members 3 are adapted with their upper edge portions 4 to engage with shoulders at the lower edge portions of the spacing members 3 on at least one side and preferably on both sides of the overlying turn of the conveyor belt 1 so as to prevent lateral displacement of the belt turns.

According to the invention the spacing members 2 are through part 8 of there length fixedly connected to the longitudinal edges of the bottom part 2 while the remaining part 5 is movable relative to the bottom part 2 and provided with a flange 6 which is inclined downwards in inward direction, said flanges 6 constituting the shoulders with which the upper edge portions 4 of the spacing members 3 are adapted to engage to prevent lateral displacement of the belt turns. The spacing members 3 are fixedly connected to two adjacent staff-shaped members included in the bottom part, while the part 5 permits movement of the staff-shaped members relative to itself. This is rendered possible by the long hole 7. The part 5 need not even surround the staff-shaped member with a long hole or the like.

That part 5 of the spacing members 3 which is movable relative to the bottom part 2 is slightly displaced laterally relative to the part 8 fixedly connected to the bottom part 2. The part 5 is adapted to overlap on the inside the part 8 of adjacent spacing members 3. Due to this fish-scale-like arrangement the piled belt turns constitute a stable pile.

The part 8 of the spacing members 3 is on its underside provided with a portion 9 which is bent straight out from it and by which the spacing members 3 are intended to rest on the spacing members 3 of the underlying turn.

Figure 5:
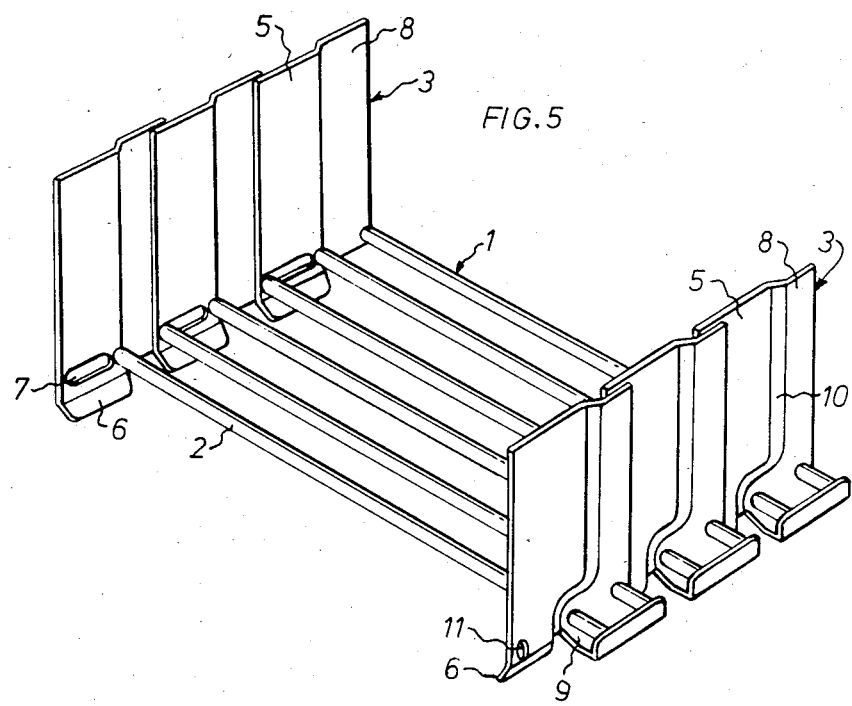
FIG. 5 is a perspective view of part of the conveyor belt with its two sides.

From the right-hand side of the conveyor belt 1 according to FIG. 5 it is clearly apparent that the distance between the parts 5 of adjacent spacing members 3 is less than the length of the flange 6 which is inclined downwards in inward direction. This flange 6 will thereby always coact with the inside of the parts 5 of the spacing members 3, which guarantees a wide bearing surface for the portion 9. This portion 9 will thus firmly rest on the upper side of the part 8 since the bend of the portion 9 may be situated over the upper side of the part 5.

The transition 10 between the parts 5 and 8 has been given a curved shape on the right-hand side of FIG. 5. This is to facilitate bending at the bottom part 2 at the same time as the part 8 must not be given too large extent at the upper side. The upper portion of the transition 10 is straight. This is to permit using the same bending tools when making spacing members 3 of different height.

As shown in FIG. 5 it is necessary only for the spacing members 3 on the left-hand side to be displaceable towards and away from one another when travelling in curves outer, and therefore the spacing members 3 are here provided with long holes 7. The spacing members 3 on the right side are to travel in inner curves (see FIG. 2) and therefore they are provided with circular holes 11.

When travelling in such curves the spacing members 3 are displaced with respect to each other on the left-hand side of FIG. 5 so that the distance between adjacent parts 5 does not cause any problems.

The invention is not restricted to that described above and shown in the drawings but may be modified within the scope of the appended claims.

What I claim and desire to secure by Letters Patent is:

1. In a conveyor of the type having an endless belt following a path which through part of its length includes a number of superposed, helically extending turns and wherein the belt comprises a plurality of link means of generally U-shaped cross sections which are articulated with one another and relatively adjustable and which respectively include spacing members arranged at opposite lateral ends of a corresponding part of the bottom of the belt, the spacing members each having a substantially upright portion and a laterally extending support portion at the base of the substantially upright portion, the respective support portions of spacing members of link means in overlying turns of the belt being supported upon upper edge portions of the respective substantially upright portions of spacing members of link means in underlying turns of the belt, whereby each overlying turn is supported upon underlying turn, the improvement wherein:
   (a) each said spacing member includes a first longitudinal portion and a second longitudinal portion integral with said first longitudinal portion, said first and second longitudinal portions including, respectively, first and second sections of the substantially upright portion of said spacing member,
   (b) said first and second sections are longitudinally displaced and laterally offset from one another,
   (c) said first longitudinal portion is fixedly connected at two longitudinally spaced points to the corresponding bottom part, said second longitudinal portion being movable relative to the bottom of the belt,
   (d) the support portion of said spacing member extends laterally from said first longitudinal portion of said spacing member, and
   (e) the respective second sections of the upright portions of spacing members on at least one side of said belt have respective flanges projecting downward and laterally inward of said belt, said flanges being disposed to engage respective upper edge portions of the substantially upright portions of underlying spacing members and thereby prevent lateral displacement of the turns of said belt.

2. The improvement of claim 1, wherein the support portion of said spacing member extends laterally outward from said first longitudinal portion at a base of said first section and wherein said second section is offset laterally inward from said first section.

3. The improvement of claim 2, wherein said second section has an open portion receiving therethrough a laterally projecting portion of the bottom part of an adjacent link means, said open portion being of sufficient length to permit turning of the belt by shifting of said spacing member relative to said bottom part of said adjacent link means.

4. The improvement of claim 3, wherein the bottom part of each of said plurality of link means comprises two longitudinally spaced, laterally extending staff-shaped members.

5. The improvement of claim 4, wherein said projecting portion is constituted by an end portion of a staff-shaped member of the bottom part of said adjacent link means.

6. The improvement of claim 1, wherein the distance between the respective second sections of adjacent spacing members is less than the length of said flanges, whereby said flanges will always engage the inside of the respective second sections of spacing members in an underlying turn of said belt.

* * * * *